US008667078B2

(12) United States Patent
Karaffa et al.

(10) Patent No.: US 8,667,078 B2
(45) Date of Patent: Mar. 4, 2014

(54) SYSTEMS AND METHODS OF EXTRACTING, STORING, AND SERVING DEVICE DEFINITION FILE INFORMATION

(75) Inventors: John Michael Karaffa, Roanoke, VA (US); Johnny Stephen Downor, Salem, VA (US); Steven William Smith, Roanoke, VA (US); David Richard Socky, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 13/149,803

(22) Filed: May 31, 2011

(65) Prior Publication Data

US 2012/0311071 A1 Dec. 6, 2012

(51) Int. Cl.
*G06F 15/16* (2006.01)
*G05B 9/02* (2006.01)

(52) U.S. Cl.
USPC ............................................ 709/217; 700/80

(58) Field of Classification Search
USPC .................................................. 709/201–246
See application file for complete search history.

(56) References Cited

U.S. PATENT DOCUMENTS

| | | | |
|---|---|---|---|
| 2004/0230582 A1 | 11/2004 | Pagnano et al. | |
| 2004/0230899 A1 | 11/2004 | Pagnano et al. | |
| 2005/0171704 A1* | 8/2005 | Lewis et al. | 702/33 |
| 2006/0229738 A1* | 10/2006 | Bhandiwad et al. | 700/9 |
| 2008/0079560 A1* | 4/2008 | Hall et al. | 340/506 |
| 2009/0276486 A1* | 11/2009 | Tandon et al. | 709/203 |
| 2009/0292996 A1* | 11/2009 | Anne et al. | 715/736 |
| 2010/0123722 A1 | 5/2010 | Grubbs et al. | |
| 2010/0205244 A1* | 8/2010 | Todorov et al. | 709/203 |

OTHER PUBLICATIONS

U.S. Appl. No. 13/149,764, filed May 31, 2011, Karaffa et al.
U.S. Appl. No. 13/149,789, filed May 31, 2011, Karaffa et al.
U.S. Appl. No. 13/149,816, filed May 31, 2011, Karaffa et al.
U.S. Appl. No. 13/149,826, filed May 31, 2011, Karaffa et al.
U.S. Appl. No. 13/149,597, filed May 31, 2011, Karaffa et al.
U.S. Appl. No. 13/149,833, filed May 31, 2011, Karaffa et al.
U.S. Appl. No. 13/149,660, filed May 31, 2011, Karaffa et al.
U.S. Appl. No. 13/149,706, filed May 31, 2011, Karaffa et al.
U.S. Appl. No. 13/149,746, filed May 31, 2011, Karaffa et al.
U.S. Appl. No. 13/149,811, filed May 31, 2011, Karaffa et al.
U.S. Appl. No. 13/040,917, filed Mar. 4, 2011, Nekkar et al.
U.S. Appl. No. 13/103,864, filed May 9, 2011, Ojha et al.
U.S. Appl. No. 13/106,741, filed May 12, 2011, Ojha et al.
http://zone.ni.com/devzone/cda/tut/p/id/3345, 12 pages, last viewed Aug. 2, 2011.
European Search Report for European Application No. EP12170093; dated Aug. 27, 2013.

* cited by examiner

*Primary Examiner* — Un C Cho
*Assistant Examiner* — Fangyan Deng
(74) *Attorney, Agent, or Firm* — Fletcher Yoder, P.C.

(57) ABSTRACT

In one embodiment, an industrial process control system includes a processor configured to translate a device definition (DD) file, extract device information for a field device from the DD file, and convert the device information into a first format. The process control system also includes a configuration server configured to receive the device information in the first format from the processor, store the device information in a memory, and respond to queries for the device information in the memory.

19 Claims, 5 Drawing Sheets

SYSTEMS AND METHODS OF EXTRACTING, STORING, AND SERVING DEVICE DEFINITION FILE INFORMATION

BACKGROUND

The subject matter disclosed herein relates to industrial process control systems.

Certain systems, such as an industrial control system, may provide for control capabilities that enable the execution of control instructions in various types of devices, such as sensors, pumps, valves, and the like. As such, the various devices may include device definition files, which define the presentation, parameters, and behaviors of the devices in the control system network.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the technique may encompass a variety of forms that may be similar to or different from the embodiments set forth below.

In one embodiment, an industrial process control system includes a processor configured to translate a device definition (DD) file, extract device information for a field device from the DD file, and convert the device information into a first format. The process control system also includes a configuration server configured to receive the device information in the first format from the processor, store the device information in a memory, and respond to queries for the device information in the memory.

In another embodiment, a method includes receiving, from a user interface of a computer, a selection of a device definition (DD) file and extracting, by a processor of the computer, device information from the DD file. The method also includes constructing, by a processor of the computer, an Extensible Markup Language (XML) data structure and populating the XML data structure with the device information from the selected DD file. The method also includes transferring the XML data structure to a configuration server for import into a symbol table.

In another embodiment, a non-transitory, tangible computer readable medium includes executable code, and the code includes instructions for importing Extensible Markup Language (XML) data into a symbol table of a configuration server, wherein the XML data comprises device information extracted from a device definition (DD) file of a field device. The code also includes instructions for receiving a query for the device information imported into the symbol table, wherein the query comprises a unique identifier for the field device. The code also includes instructions for sending a response to the query, wherein the response comprises a portion of the device information from the symbol table for the field device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A typical Fieldbus Foundation device includes a Fieldbus Foundation Device Definition (DD) file, which may be provided by the manufacturer and includes information about the device in a format that is defined by the Fieldbus Foundation standards. This DD file may include device parameters, device descriptions, graphical symbols or icons to present the device on a graphical user interface, software blocks, and the like, in a binary format that is consumable by a portion of the components present within a control system. However, certain components within the control system network may not have access to, and/or may not be configured to extract information from, a DD file for a particular Fieldbus Foundation device and, therefore, may not have access to DD information that may be useful in visualizing and/or managing the device. As such, the disclosed embodiments address this problem using a conversion tool (i.e., conversion application module) that extracts the information from an operator-selected DD file and converts this information into another format (e.g., Extensible Markup Language (XML) format) that may be stored within a symbol table on a configuration server for centralized access by components within the control system network.

Figure 1:
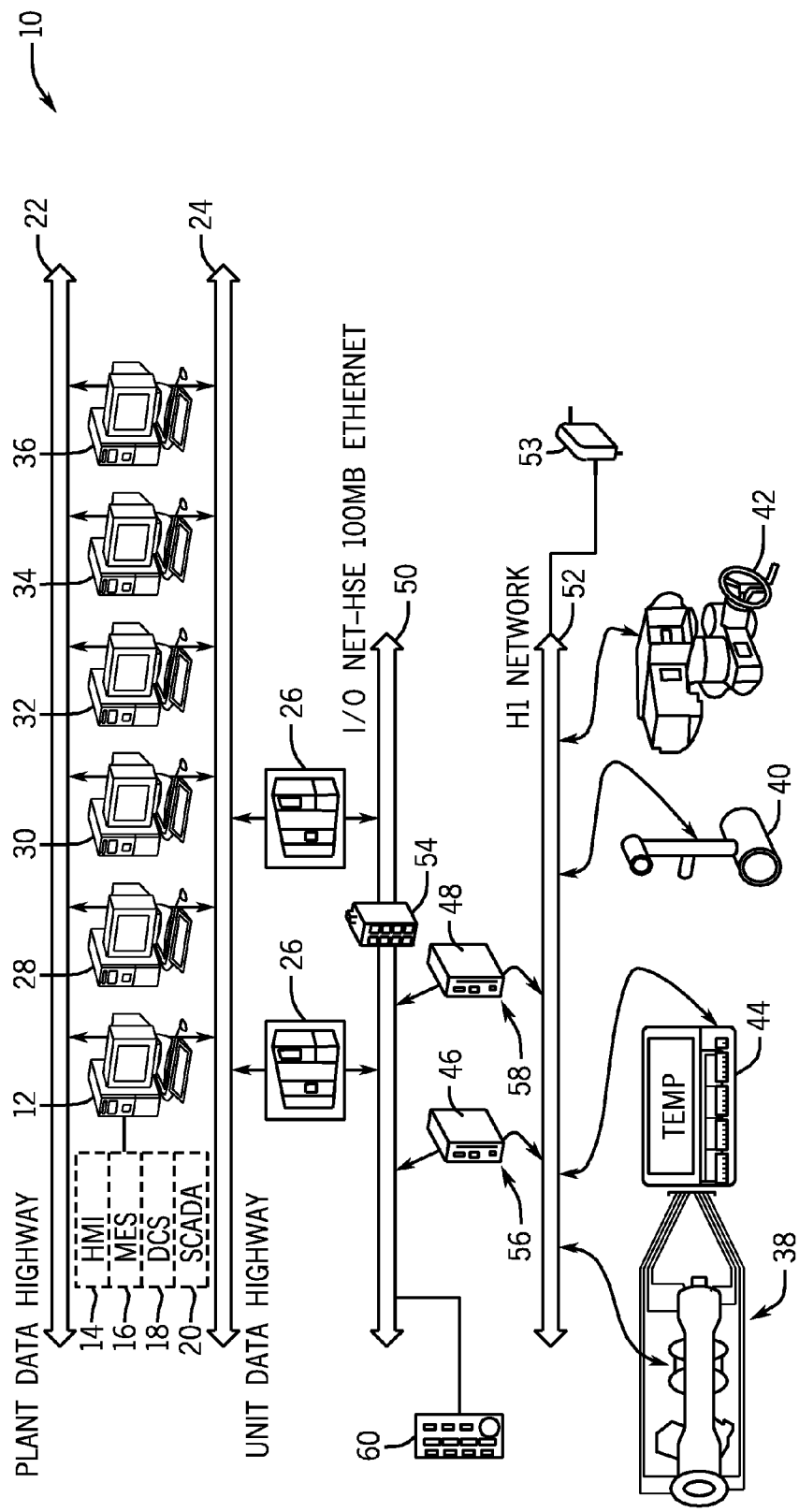
FIG. 1 is a schematic diagram of an embodiment of an industrial control system.

With the foregoing in mind, turning to FIG. 1, an embodiment of an industrial process control system 10 is depicted. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Co., of Schenectady, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts a Workstation Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, and a computer 36 hosting an alarm viewer. In another embodiment, computer 36 may instead host ToolboxST™, available from General Electric Co., of Schenectady, N.Y. Other computers coupled to the plant data highway 22 and/or the unit data highway 24 may include computers hosting Cimplicity™ and ControlST™.

The system 10 may include any number and suitable configuration of industrial controllers 26. For example, in some embodiments the system 10 may include one industrial controller 26 or two, three, or more industrial controllers 26 for redundancy. The industrial controllers 26 may enable control logic useful in automating a variety of plant equipment, such as a turbine system 38, a valve 40, and a pump 42. Indeed, the industrial controller 26 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), and so forth.

In the depicted embodiment, the turbine system 38, the valve 40, the pump 42, and the temperature sensor 44 are communicatively interlinked to the automation controller 26 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as one of the industrial controllers 26, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/O Net 50 and the H1 network 52. Accordingly, a variety of devices may be linked to the industrial controller 26 and to the computer 12. For example, the devices, such as the turbine system 38, the valve 40, the pump 42, and the temperature sensor 44, may include industrial devices, such as Fieldbus Foundation™ devices that include support for the Foundation H1 bi-directional communications protocol. In such an embodiment, a Fieldbus Foundation power supply 53, such as a Phoenix Contact Fieldbus Power Supply available from Phoenix Contact of Middletown, Pa., may also be coupled to the H1 network 52 and may be coupled to a power source, such as AC or DC power. The devices 38, 40, 42, and 44 may also include support for other communication protocols, such as those included in the HART® Communications Foundation (HCF) protocol, and the Profibus Nutzer Organization e.V. (PNO) protocol.

Each of the linking devices 46 and 48 may include one or more segment ports 56 and 58 useful in segmenting the H1 network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58, may enable a physical separation useful in maintaining fault tolerance, redundancy, and improving communications time. In some embodiments, additional devices may be coupled to the I/O NET 50. For example, in one embodiment an I/O pack 60 may be coupled to the I/O NET 50.

Figure 2:
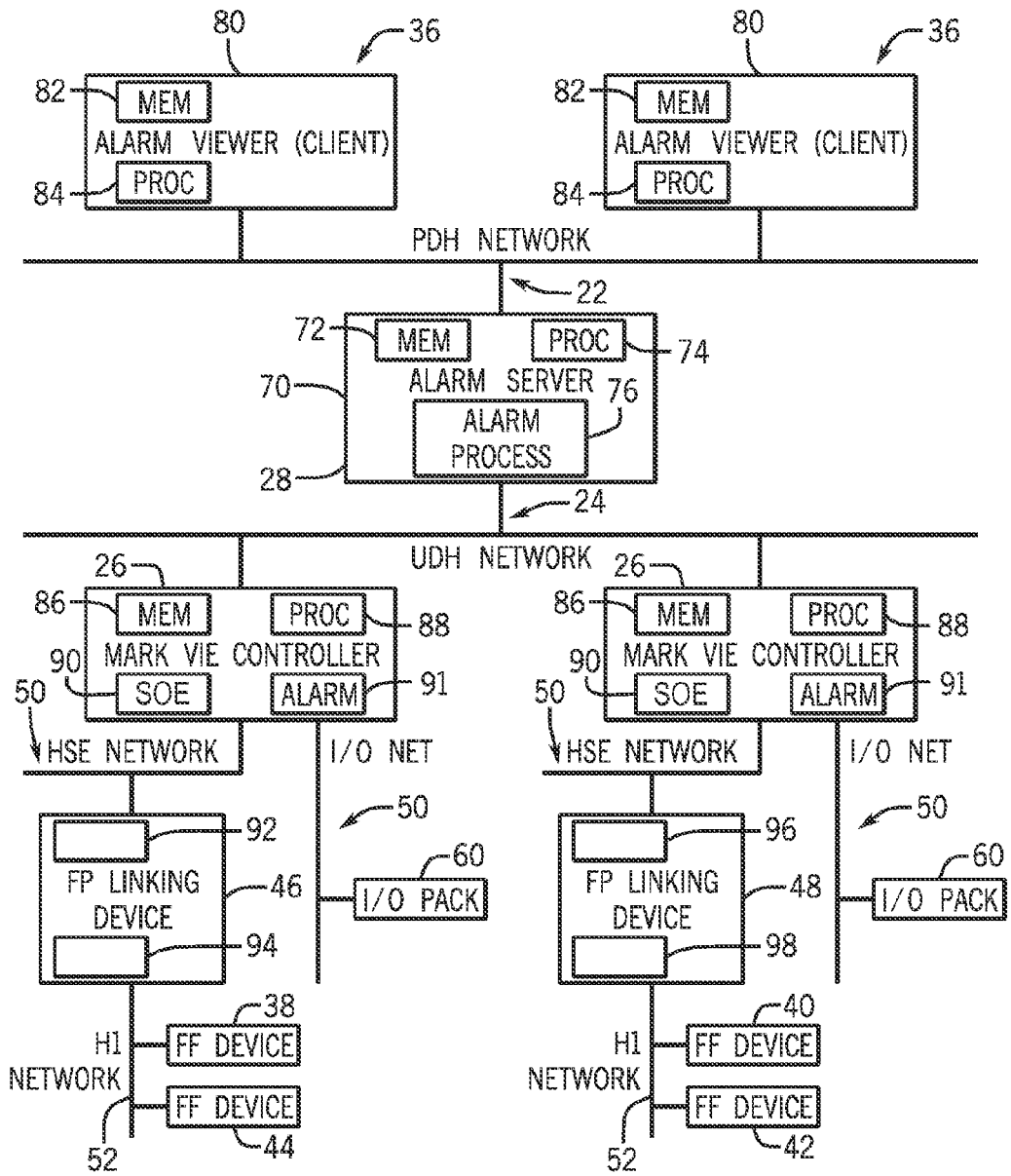
FIG. 2 is another schematic diagram of an embodiment of an industrial control system.

In certain embodiments, the devices 38, 40, 42, and 44 may provide data, such as alerts, to the system 10. These alerts may be handled in accordance with the embodiments described below. FIG. 2 depicts a block diagram of an embodiment of the system 10 depicting various components in further detail. As described above, the system 10 may include an alarm server 70, executed on the computer 28, coupled to the plant data highway 22 and the unit data highway 24. The computer 28 may include a memory 72, such as non-volatile memory and volatile memory, and a processor 74, to facilitate execution of the alarm server 70. The alarm server 70 may execute an alarm process 76 for receiving, processing, and responding to alarms received from the controllers 26.

The system 10 may include additional computers 36 coupled to the plant data highway 22 that may execute alarm viewers 80. The alarm viewers 80 may enable a user to view and interact with the alarms processed by the alarm server 70. The computers 36 may each include a memory 82 and a processor 84 for executing the alarm viewer 80. Additionally, in some embodiments, the alarm viewers 80 may be executed on the computer 28 or any of the computers described above in FIG. 1. The alarm server 70 may communicate with the alarm viewers 80 using any suitable alarm data protocol interpretable by the alarm viewers 80.

As described above, the controllers 26 are coupled to the unit data highway 24, and the controllers 26 may communicate with the alarm server 70 over the unit data highway 24. For example, in one embodiment, the controllers 26 and alarm server 70 may communicate using a serial data interface (SDI) alarm protocol. The controllers 26 may each include a memory 86 and a processor 88 for executing the functions of the controllers 26. In one embodiment, the controllers 26 may execute a sequence of events (SOE) process 90 and an alarm process 91. As mentioned above, the controllers 26 may be coupled to the I/O pack 60 over the I/O NET 50. In one embodiment, the I/O pack 60 may communicate with the controllers 26 using the ADL protocol.

As also described above, the controllers 26 may be coupled to linking devices 46 and 48 through an I/O NET 50. The linking devices 46 and 48 may communicate with the controllers 26 over the I/O NET 50. The linking devices 46 and 48 may be coupled to the H1 network 52, and one linking device 46 may be coupled to devices 38 and 44 and another linking device 48 may be coupled to device 40 and 42. The linking device 46 may include a memory 92, such as volatile and non-volatile memory, and a processor 94, and the linking device 48 may include a memory 96, such as volatile and non-volatile memory, and a processor 98. In one embodiment, the linking devices 46 and 48 may communicate with the controllers 26 using the Fieldbus Foundation protocol.

The system 10 may enable alarm and diagnostic information to be communicated from the various devices to a user, such as through the HMI 14 and the alarm viewers 80. For example, the Fieldbus Foundation devices 38, 40, 42, and 44 may provide an alert to the controller 26. The alert may be provided from the controller 26 to the alarm server 70, which may process the alert and provide a corresponding alarm to the HMI 14, the alarm viewers 80, or any other computers coupled to the unit data highway 24 or plant data highway 22.

Fieldbus Foundation devices 38, 40, 42, and 44 may include a Fieldbus Foundation Device Definition (DD) file that may be provided by the device manufacturer based upon the Fieldbus Foundation specification. As such, a DD file may include instructions written in the International Electrotechnical Commission (IEC) 61804 language standard. A DD file may include device parameters or attributes (e.g., device identifiers, revision numbers, operational ranges, etc.), descriptions (e.g., device descriptions, parameter descriptions, alarm descriptions, etc.), graphical symbols or icons to represent the device (e.g., icon for healthy device, icon for device with alarm active, icon for deactivated device, etc.), and software blocks (e.g., sets of instructions that define actions for the device and the control system in response to certain events). The DD file may be in a binary format that is interpretable by the Fieldbus Foundation components of the control system network (e.g., controller 26).

However, other system components, such as the alarm server 70 or the alarm viewers 80, may not be configured to directly access and extract information from a DD file for a particular device. For example, when the alarm viewer 80 presents an alarm to an operator, it may be desirable to have a portion of the information typically included in the DD file presented to the operator. That is, when the alarm viewer 80 presents an alarm to the operator for a device, it may be useful for the alarm viewer 80 to also present the operator with information about the operational ranges of the device, appropriate and standardized icons for the device in its present state, and description information about the device, its parameters, and its alarms. As such, it may be useful for the alarm server 70 to have access to the information contained within the DD files for a particular device in order to provide more complete information about the device to the operator (e.g., through alarm viewer 80) in a standard fashion. Additionally, since multiple components of the control system may benefit from having access to this DD information, it may be beneficial to have the information stored in a centralized location. That is, in order to provide efficient access to the DD file information and to limit data duplication within the control system, it may be beneficial to have the information stored and maintained on a centralized server (e.g., on a non-transitory, computer-readable medium of the Workstation EGD configuration server) so that it is accessible to multiple components.

Figure 3:
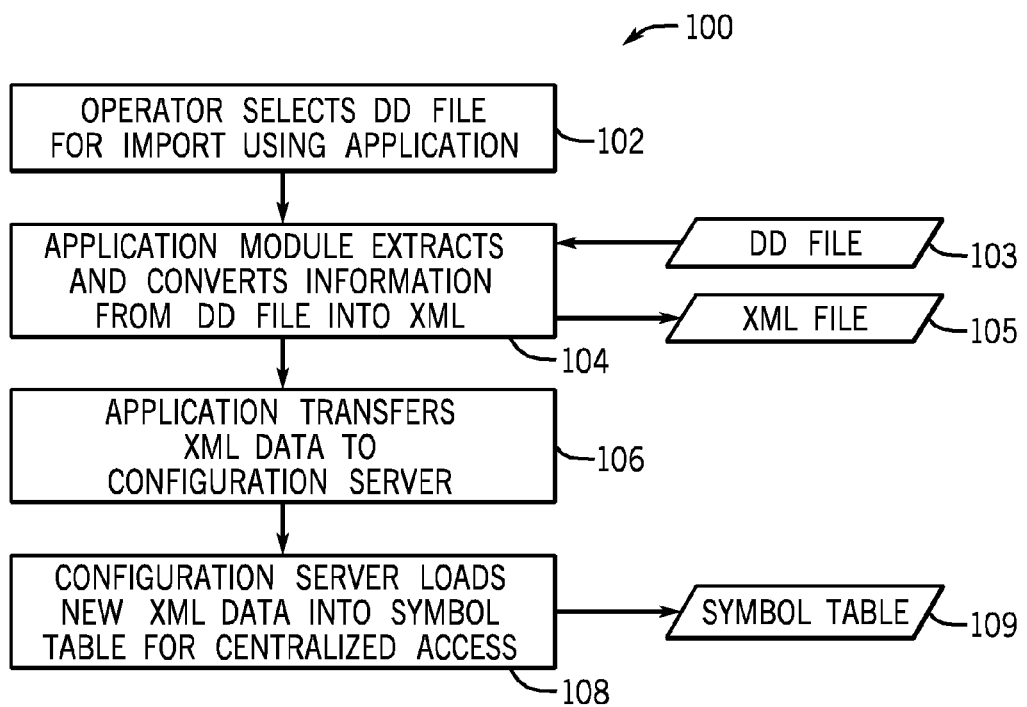
FIG. 3 is a block diagram illustrating a process of converting and importing the information from a device definition file, in accordance with aspects of the present disclosure.

Accordingly, FIG. 3 illustrates an embodiment of a process 100 of converting a DD file to another format, such as extensible markup language (XML), unified modeling language (UML), or hypertext markup language (HTML), and making the information included therein centrally available to components of the control system network (e.g., from a non-transitory, computer-readable medium of the configuration server on computer 30). In some embodiments, some or all of the aspects of the process 100 described below may be implemented as executable code instructions stored on non-transitory, tangible, computer-readable media, such as the memory of 72 of the alarm server 70, the memory 82 of the alarm viewer 80, the memory 86 of the controllers 26, or the memory of the computer 30 executing the configuration server.

The process 100 begins with the operator selecting (block 102) a DD file 103 for import using a user interface of a conversion application executing on one of the components described above in FIG. 1, (e.g., running on computer 36), such as ToolboxST™, available from General Electric Co., of Schenectady, N.Y. The conversion application may include a module or widget that is configured to translate and extract information from the DD file 103. For example, a module of the conversion application may extract (block 104) at least a portion of the information in the DD file 103 and convert the information into XML file format 105. Once converted, the XML file 105 may be transferred (block 106) to a configuration server, such as the Workstation EGD configuration server executing on computer 30. The configuration server may then load (block 108) the transferred XML file 105 into symbol table 109 for centralized access by the components of the control system network. The symbol table 109 may be implemented as a database table, a hash table, or similar data structure that may be queried to provide quick access to the stored DD file parameters.

Figure 4:
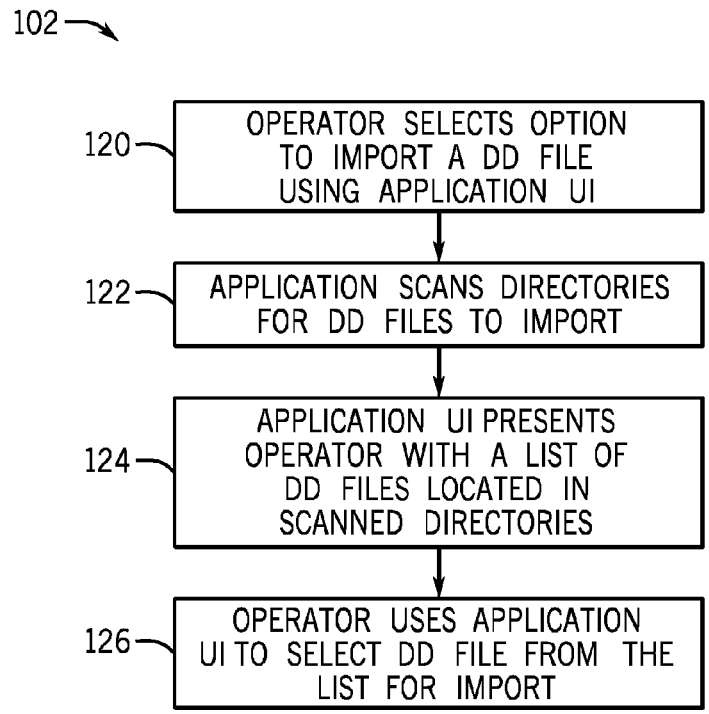
FIG. 4 is a block diagram illustrating a process of selecting a device definition file for import, in accordance with aspects of the present disclosure.

FIG. 4 depicts the operator selection, as described above in block 102 of FIG. 3, in further detail. The selection 102 begins with the operator using a user interface (e.g., a graphical user interface) of a conversion application (e.g., ToolboxST™) to select (block 120) an option to import a DD file. In certain embodiments, an "Import Device Definition File" option may be selected by the operator using a drop-down menu system or using an icon from a quick launch or shortcut menu. In certain embodiments, a specific Fieldbus Foundation device may first be selected, and a separate navigation pane may subsequently be populated with various parameters and actions to be performed on the device, including an "Import Device Definition File" option. In another embodiment, a specific Fieldbus Foundation device may be selected using an alternative select (e.g., a right click of a mouse, or a shift key of a keyboard and a left click of a mouse in combination) and display a context menu that includes various actions that may be performed for the device, including an "Import Device Definition File" option. In another embodiment, when the operator selects an option to add a new Fieldbus Foundation device to the network, the operator may be subsequently be presented with an option (e.g., via a pop-up or dialog box) to import a DD file for the new device.

Regardless of how the option to import a DD file is selected by the operator, after receiving the request from the operator, the conversion application scans (block 122) a user library and other library directories (e.g., standard library directories) for DD files to import. In certain embodiments, the conversion application may be configured to scan other directories, such as other directories selected by the operator, for DD files to import. The conversion application may search for files adhering to the DD or DDv5 format defined in the Fieldbus Foundation standard (e.g., FF-694) and, accordingly, may search for files having the file extensions ".ff5", ".ffo", ".sy5", or ".sym" that are in the proper format.

Once the conversion application has located all of the DD files in the searched directories, the user interface of the conversion application may present (block 124) the operator with a list of all DD files that were located in the search. The operator may then use the user interface to select (block 126) one or more DD files for import. In certain embodiments, if the desired DD file is not included in the list of DD files displayed, the operator may be provided an opportunity to manually search for a file from a directory and select it for import.

Figure 5:
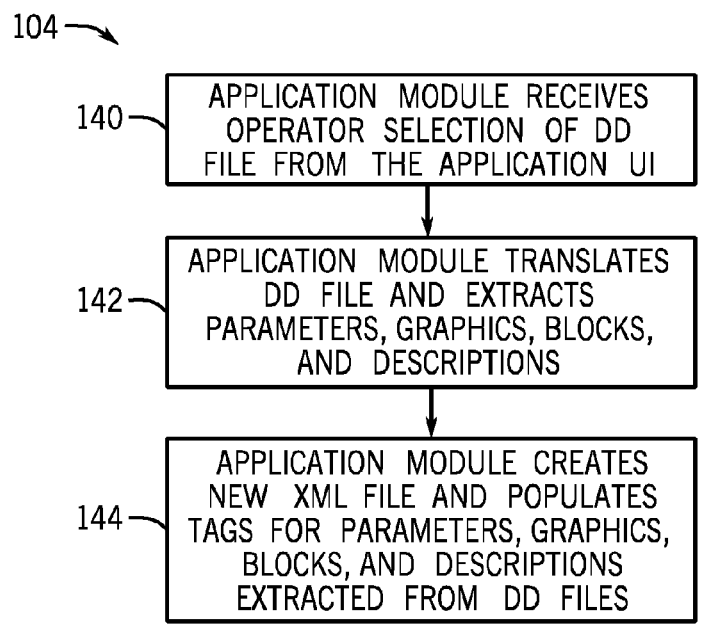
FIG. 5 is a block diagram illustrating a process of extracting the information from a selected definition file and converting it into XML for import, in accordance with aspects of the present disclosure.

FIG. 5 depicts the extraction and conversion process of the DD file 103, as shown above in block 104 of FIG. 3 in further detail. The extraction and conversion (104) begins with the conversion application module receiving (block 140) the operator's selection of the DD file 103 from the user interface for import. Upon receipt of the selection, the conversion application module may locate the DD file 103 in the directory structure and open the file. The module may then translate (block 142) the file and extract parameters, graphics, blocks, descriptions, etc., from the DD file 103. In certain embodiments, the DD file 103 may be verified before translation and extraction. The verification may include, for example, examining the file in its entirety to ensure compliance with a DD file standard. In certain embodiments, the translation (block 142) may include a disassembling and/or decompiling step, prior to extracting, in which the binary data contained within the file may be converted into other formats. For example, textual data, such descriptions for device parameters and alarms, may be translated from binary into human-readable ASCII or Unicode, and graphical or icon data may be translated to a bitmap or other commonly used formats for image data (e.g., JPEG, GIF, ICO, etc.). Additionally, blocks of code may be translated into code of a particular computer language (e.g., C, C++, Visual Basic, Java, Fortran, Ada, etc.), pseudo-code, or into a graphical representation of the instructions (e.g., a flow chart).

After the DD file 103 has been translated and the device information has been extracted (e.g., into memory or a temporary file), the conversion application may then create (block 144) an XML file 105 and populate tags within the XML file 105 with the information extracted from the DD file 103. For example, the XML file 105 may contain a "Device Description" tag that may be populated with a textual description of the device and how it functions. Additionally, the XML file 105 may, for example, contain a "Custom Alarm Description" tag that may be populated with a textual description of a particular custom alarm for the device. In another example, the XML file 105 may contain a "Normal Image" tag that may be populated with bitmap image data that may be used to present an image or icon for the device within a graphical user interface when the device is in a normal (i.e., a healthy or non-alarmed) state. In addition to other information extracted from the DD file 103, the XML file 105 may include a tag (e.g., a device identifier), or several tags (e.g., a manufacturer identifier, device type, and device revision) in combination, that may be used to uniquely identify the device. In certain embodiments, the assembled XML file 105 may be temporarily stored by the conversion application (e.g., as a string or a file in the random access memory (RAM) of the configuration server executing on computer 30), while in other embodiments, the XML file 105 may be stored in a non-volatile memory (e.g., on a hard drive or solid state drive of the configuration server executing on computer 30) for later access by the conversion application or other components of the system 10.

Referring once more to FIG. 3, once the DD file information has been converted into XML, the conversion application transfers (block 106) the XML file 105 to the configuration server, e.g., the Workstation EGD server executing on computer 30. In certain embodiments, the XML file 105 may be transferred across the plant data highway 22 or the unit data highway 24. In other embodiments, the conversion application and the configuration server may reside on the same computer (e.g., on computer 36 as separate processes or groups of processes) and the XML file 105 may accordingly be exchanged via a commonly accessible memory space, a commonly accessible file on a local drive, or local loop-back network communication.

The configuration server may be responsible for maintaining a symbol table 109 (e.g., comprising one or more XML files) that serves as a centralized repository for device and configuration data. Upon receiving the XML file 105 from the conversion application, the configuration server loads (block 108) the XML data from the XML file 105 into the symbol table 109. In certain embodiments, the XML file 105 may be appended to the symbol table 109 that the configuration server is currently using (e.g., loaded in RAM of the configuration server executing on computer 30), and the symbol table 109, including the new XML data, may be written to a non-volatile medium (e.g., hard drive or solid state drive of the configuration server executing on computer 30) immediately or at a later time (e.g., during server idle time). In certain embodiments, the configuration server may instead append the XML file 105 to the file on the storage medium (e.g., hard drive or solid state drive) that contains the symbol table 109, and after appending, the configuration server may reload the entire symbol table (including the new XML data from the XML file 105) into memory.

Figure 6:
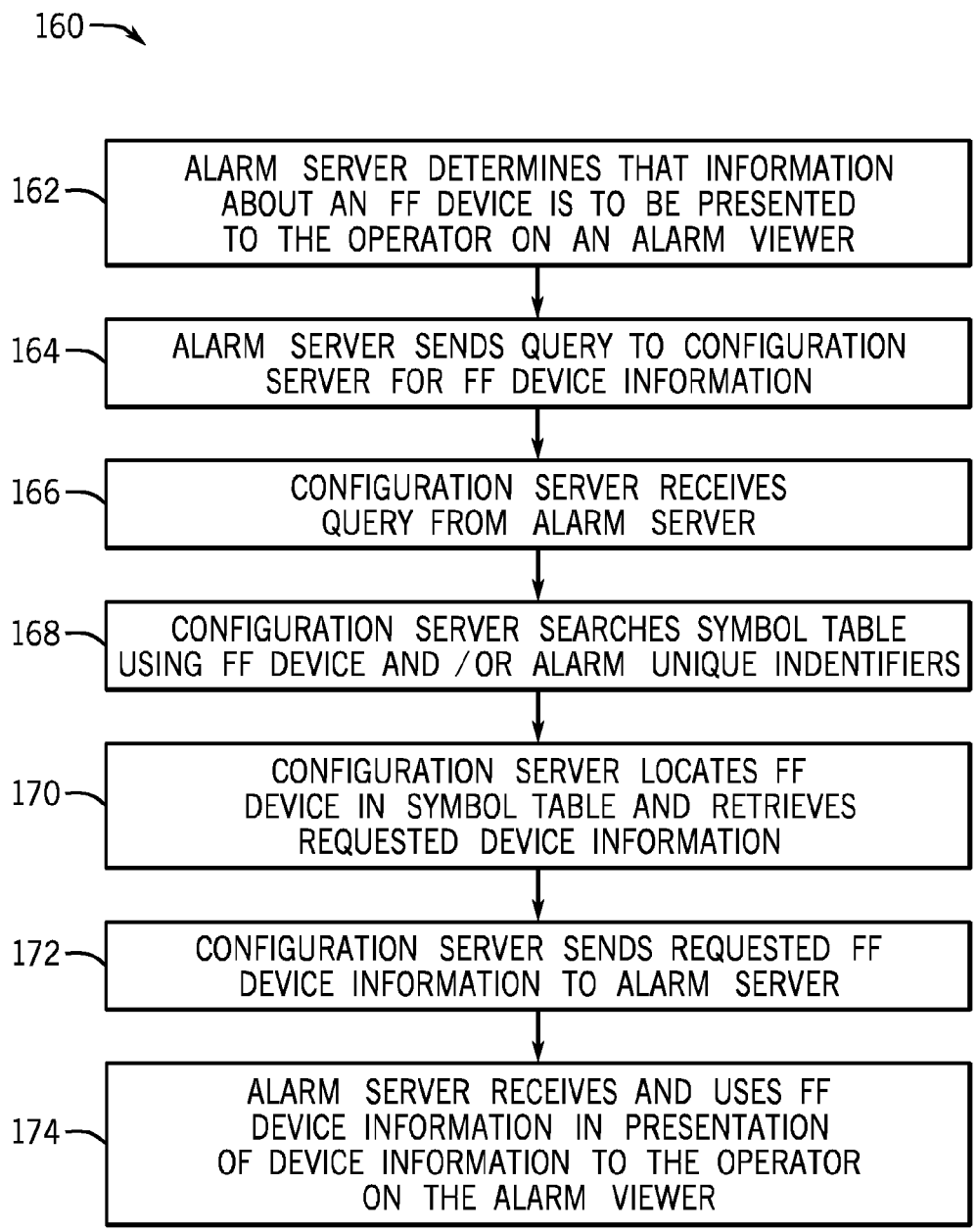
FIG. 6 is a block diagram illustrating a process of querying device definition file information from a centralized symbol table, in accordance with aspects of the present disclosure.

Once the XML file 105 that contains the extracted DD information has been loaded into the symbol table 109 by the configuration server, the DD information may be ready for centralized access by other components in the control system network. For example, FIG. 6 illustrates an embodiment of a process 160 in which an alarm viewer 80 utilizes DD information stored in the configuration server's symbol table (e.g., in a non-transitory, computer-readable medium of computer 30 executing the Workstation EGD configuration server) to present device information to the operator. The process 160 begins with the alarm server 70 determining (block 162) that information about a Fieldbus Foundation device needs to be presented to an operator. For example, the alarm server 70 may determine that an alarm viewer 80 will display an alert condition for a particular device to the operator. Alternatively, the alarm viewer 80 may present information about a particular Fieldbus Foundation device in response to a query by the operator using the user interface of the alarm viewer 80 (e.g., operator selection of the device, or operator selection to obtain additional information about the device).

Accordingly, the alarm server 70 may send (block 164) a query to the configuration server to obtain information about the Fieldbus Foundation device. In certain embodiments, the query may traverse the plant data highway 22 or the unit data highway 24 before it is received (block 166) by the configuration server. The query includes information to uniquely identify the device in the symbol table 109. That is, the lookup request may include a field (e.g., a device identifier), or several fields (e.g., a manufacturer identifier, device type, and device revision) in combination, that can be used to uniquely identify (i.e., locate) the device in the symbol table 109. Additionally, the query may include information to uniquely identify a particular alarm (e.g., an alarm ID number) such that information stored within the symbol table for the specified device and alarm may be located.

Accordingly, the configuration server then searches (block 168) the symbol table 109 using the device (and possibly alarm) unique identifiers provided in the query. In certain embodiments, the symbol table 109 may be implemented as an array that is sorted by device unique identifier(s). Further, in some embodiments, an ordered search (e.g., a binary search) may be performed on the symbol table 109 to locate the Fieldbus Foundation device identified in the query. In certain embodiments, the symbol table 109 may be implemented as a hash table and the unique identifier, or the unique identifiers appended one to another, may serve as a key for the query operation. In other embodiments, the symbol table 109 may be loaded into memory in a database table in which the unique identifier(s) serve as a primary key and the query may be translated into a database query (e.g., using structured query language, SQL) to locate the desired device information.

Next, the configuration server locates (block 170) the Fieldbus Foundation device in the symbol table 109 and extracts the requested device information. In certain embodiments, the query may include specific fields that the alarm server 70 wants to present. For example, in addition to information to uniquely identify the device or alarm, the query may include a request for "Device Description" information (i.e., information contained in a "Device Description" field or tag for the specified device). As such, after locating the device specified in the symbol table, the configuration server may include the "Device Description" field or tag when constructing a response to the query. By further example, the query may include a request for "Alarm Image" information, and, accordingly, the configuration server may include the image data stored in an "Alarm Image" field when constructing a response to the query. In another embodiment, the query may include only the unique identifier(s) for a device, and all of the information stored in the symbol table for the identified device may be included when the configuration server is constructing a response to the query. When the configuration server has finished constructing a response containing some or all of the information from the symbol table 109 for the device identified in the query, the configuration server sends (block 172) the response to the alarm server 70. In certain embodiments, the response may be transmitted over the plant data highway 22 or the unit data highway 24 to reach the alarm server 70.

Upon receiving the device information from the configuration server, the alarm server 70 uses (block 174) the received device information in the presentation of the device information to the operator on the alarm viewer 80. For example, if the received information includes a "Device Description," the textual data (originally extracted from the DD file) may be presented to the operator on the alarm viewer 80 when the device is presented. By further example, if the received information includes "Alarm Image" data and the alarm status of the device is appropriate, the alarm server 70 may cause the alarm viewer 80 to present the "Alarm Image" data (originally extracted from the DD file) to the operator when displaying an image for the device the alarm viewer 80.

Technical effects of the invention include providing improved standardization in the presentation of device information to an operator. Since the Fieldbus Foundation DD file may define the presentation of the device (e.g., images to be used to display the device with a normal or alarm status) as well as descriptions for the device and its various parameters, by using this information in the presentation of the device throughout the network (e.g., the HMI 14, MES 16, SCADA 20, alarm viewers 80, etc.), the operator may receive a relatively uniform presentation of the device and device information regardless of which interface is used to access the network. Standardizing the appearance and the presentation of device information may reduce operator learning time, confusion, and error. Additionally, by storing the DD file information in a centralized symbol table, the device information need only be maintained and updated in a single location on the control system network. Accordingly, when DD information needs to be updated (e.g., due to the release of a DD file update by the device manufacturer), once information from the DD file has been extracted, converted, and loaded into the symbol table as described herein, all of the components in the control system network may have immediate access to the DD file information.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial process control system comprising:
 a processor configured to:
  translate a device definition (DD) file, wherein the DD file comprises instructions written in an International Electrotechnical Commission (IEC) language standard;
  extract device information for a field device from the DD file, and
  convert the device information into a first format, wherein the first format comprises Extensible Markup Language (XML);
 a configuration server including the processor, and configured to:
  receive the device information in the first format from the processor,
  store the device information into a symbol table stored in a memory of the configuration server for centralized access by one or more components of the industrial process control system; and
  respond to queries for the device information in the symbol table; and
 an alarm server configured to send a query directly to the configuration server for the stored device information, wherein the query comprises a set of unique identifiers of the field device, and wherein the set of unique identifiers comprises a device type, a device revision, and an alarm identification number.

2. The system of claim 1, wherein first format comprises unified modeling language (UML) or hypertext markup language (HTML).

3. The system of claim 1, comprising a user interface executable by the processor and configured to receive an operator selection of the DD file to import for the field device.

4. The system of claim 1, wherein the device information comprises one or more of device identifiers, device parameters, device descriptions, alarm identifiers, alarm descriptions, blocks of instructions, normal and alarm graphics, or a combination thereof, for the field device.

5. The system of claim 1, wherein the field device comprises a Fieldbus Foundation device, a HART field device, a Profibus field device, or a combination thereof.

6. The system of claim 1, wherein the IEC language standard comprises a 61804 language standard.

7. A method comprising:
receiving, from a user interface of a computer, a selection of a device definition (DD) file, wherein the DD file comprises instructions written in an International Electrotechnical Commission (IEC) language standard;
extracting, by a processor of the computer, device information from the DD file;
constructing, by the processor of the computer, an Extensible Markup Language (XML) data structure and populating the XML data structure with the device information from the selected DD file; and
transferring the XML data structure to a configuration server for import into a symbol table for centralized access by one or more components of a industrial process control system; and
sending a query via an alarm server directly to the configuration server for the stored device information, wherein the query comprises a set of unique identifiers of the field device, and wherein the set of unique identifiers comprises a device type, a device revision, and an alarm identification number,
comprises a device type, a device revision, and an alarm identification number.

8. The method of claim 7, comprising presenting an operator with a list of DD files to import.

9. The method of claim 7, wherein the XML data structure is transferred via a plant data highway or a unit data highway.

10. The method of claim 7, wherein extracting device information from the DD file comprises extracting device information for a Fieldbus Foundation device, a HART field device, a Profibus field device, or a combination thereof.

11. The method of claim 7, wherein the (IEC) language standard comprises a 61804 language standard.

12. The method of claim 7, wherein the device information comprises one or more of device identifiers, device parameters, device descriptions, alarm identifiers, alarm descriptions, blocks of instructions, normal and alarm graphics, or a combination thereof, for the field device.

13. The method of claim 7, comprising translating the device information from the selected DD file.

14. The method of claim 13, wherein translating comprises one or more of disassembling operations, decompiling operations, data conversion operations, or a combination thereof.

15. A non-transitory, tangible computer readable medium comprising executable code, the code comprising instructions for:
importing Extensible Markup Language (XML) data into a symbol table of a configuration server for centralized access by one or more components of an industrial process control system, wherein the XML data comprises device information extracted from a device definition (DD) file of a field device;
receiving a query directly from an alarm server via the configuration server for the device information imported into the symbol table, wherein the query comprises a set of unique identifiers for the field device, and wherein the set of unique identifiers comprises a manufacturer identifier, a device type, a device revision, and an alarm identification number; and
sending a reply to the query via the configuration server, wherein the reply comprises a portion of the device information from the symbol table for the field device.

16. The non-transitory, tangible computer readable medium of claim 15, wherein the field device comprises a Fieldbus Foundation device, a HART field device, a Profibus field device, or a combination thereof.

17. The non-transitory, tangible computer readable medium of claim 15, wherein the device information comprises one or more of device identifiers, device parameters, device descriptions, alarm identifiers, alarm descriptions, blocks of instructions, normal and alarm graphics, or a combination thereof, for the field device.

18. The non-transitory, tangible computer readable medium of claim 15, wherein the query comprises information to uniquely identifying an alarm for the identified field device.

19. The non-transitory, tangible computer readable medium of claim 15, wherein the instructions for importing the XML data into the symbol table on the configuration server comprises instructions for sending a confirmation message to a user interface.

* * * * *

UNITED STATES PATENT AND TRADEMARK OFFICE
CERTIFICATE OF CORRECTION

| | | |
|---|---|---|
| PATENT NO. | : 8,667,078 B2 | Page 1 of 1 |
| APPLICATION NO. | : 13/149803 | |
| DATED | : March 4, 2014 | |
| INVENTOR(S) | : John Michael Karaffa et al. | |

It is certified that error appears in the above-identified patent and that said Letters Patent is hereby corrected as shown below:

In the Claims:

Column 11, lines 30-31, Claim 7, please delete "comprises a device type, a device revision, and an alarm indentification number".

Signed and Sealed this
Nineteenth Day of January, 2016

Michelle K. Lee
*Director of the United States Patent and Trademark Office*